United States Patent [19]

Aihara et al.

[11] Patent Number: 4,821,991

[45] Date of Patent: Apr. 18, 1989

[54] SEAT SLIDE DEVICE

[75] Inventors: Tsutomu Aihara, Yokohama; Masakazu Muraishi, Isehara, both of Japan

[73] Assignees: Nissan Motor Co., Ltd.; Ohi Seisakusho Co., Ltd., both of Yokohama, Japan

[21] Appl. No.: 35,428

[22] Filed: Apr. 7, 1987

[30] Foreign Application Priority Data

Apr. 7, 1986 [JP] Japan ................................. 61-78224

[51] Int. Cl.⁴ ............................................ F16M 13/00
[52] U.S. Cl. .................................. 248/430; 296/65.1; 312/341 R; 384/47
[58] Field of Search ............... 248/420, 424, 429, 430; 312/341 R; 384/48, 47; 296/65 R

[56] References Cited

U.S. PATENT DOCUMENTS

| 3,491,979 | 1/1970 | Wonell | 296/65 R X |
|---|---|---|---|
| 4,533,107 | 8/1985 | Okasaki et al. | 248/430 |
| 4,569,563 | 2/1986 | Fourrey | 384/49 |
| 4,580,755 | 4/1986 | Rees | 248/430 |
| 4,621,784 | 11/1986 | Kaesling et al. | 248/419 X |
| 4,635,890 | 1/1987 | Matsuda et al. | 248/429 |
| 4,653,807 | 3/1987 | Hirose et al. | 248/430 X |
| 4,660,795 | 4/1987 | Ikegaya et al. | 248/430 |
| 4,756,503 | 7/1988 | Fujita | 248/230 |

FOREIGN PATENT DOCUMENTS

| 0076041 | 4/1983 | European Pat. Off. . |
|---|---|---|
| 0182072 | 5/1986 | European Pat. Off. . |
| 0181499 | 5/1986 | European Pat. Off. . |
| 54-17224 | 2/1979 | Japan . |
| 1589126 | 5/1981 | United Kingdom . |
| 1602844 | 11/1981 | United Kingdom . |
| 2107575 | 6/1982 | United Kingdom . |

Primary Examiner—Ramon O. Ramirez
Attorney, Agent, or Firm—Foley & Lardner, Schwartz, Jeffery, Schwaab, Mack, Blumenthal & Evans

[57] ABSTRACT

A seat slide device is disclosed which comprises a stationary rail having an angularly C-shaped cross section and a movable rail having a reversed T-shaped cross section. The movable rail is coupled with the stationary rail in such a manner that the enlarged head portion of the movable rail is spacedly received in the stationary rail thereby to define below the enlarged head portion a single elongate space in which rollers are rotatably received and above the enlarged head portion two parallel elongate spaces in which ball bearings are rotatably received. Inward sides of the stationary rail and the outward ends of the enlarged head portion of the movable rail are bent at generally right angles in order to hold the ball bearings in the two parallel elongate spaces.

3 Claims, 2 Drawing Sheets

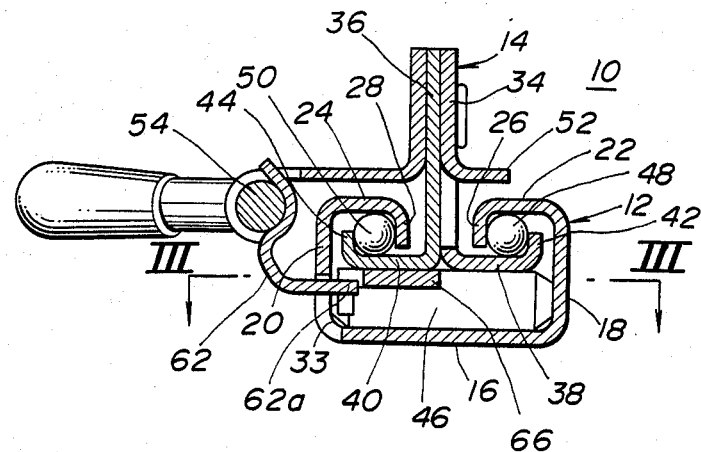
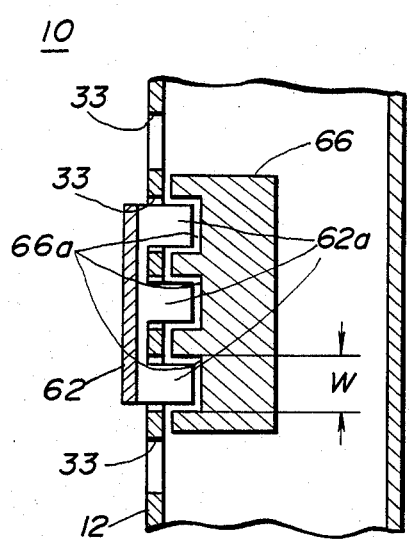
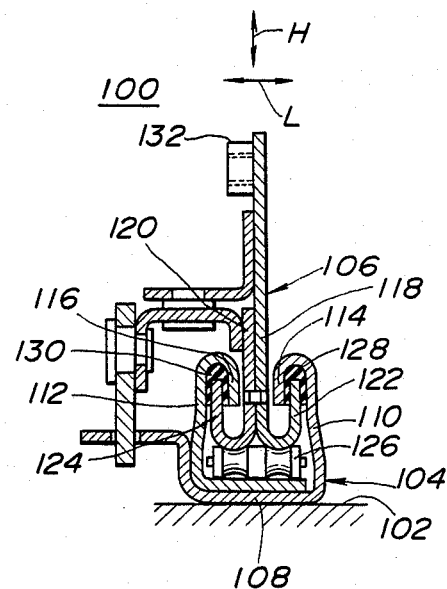

SEAT SLIDE DEVICE

BACKGROUND OF THE INVENTION

1. Field of the Invention

The present invention relates in general to a seat slide device for sliding a seat to a desired position, and more particularly to a seat slide device for use in a motor vehicle, which is easy to manufacture and has a tough structure.

2. Description of the Prior Art

Hitherto, various kinds of seat slide devices have been proposed and put into practical use particularly in the field of automotive seats. However, as will be outlined hereinafter, some of them are difficult to manufacture and fail to have a tough structure because of their inherencies in their construction.

SUMMARY OF THE INVENTION

It is therefore an object of the present invention to provide a seat slide device which is easy to manufacture and has a tough structure.

According to the present invention, there is provided a seat slide device for sliding a seat relative to a floor, which comprises a stationary rail including an elongate flat base portion adapted to be mounted on the floor, side wall portions extending upwardly from opposed sides of the base portion, upper flat wall portions extending toward each other from the upper ends of the side wall portions, and hanging down portions extending downwardly from the inward ends of the upper flat wall portions leaving therebetween an axially extending clearance also included is: a movable rail including an elongate base portion, lower flat wall portions each extending outwardly from the lower end of the elongate base portion and raised portions extending upwardly from the outward ends of the lower flat wall portion, the movable rail is coupled with. The stationary rail in such a manner that the lower flat wall portions are received in the stationary rail with the elongate base portion extending upwardly through the axially extending clearance of the stationary rail. A plurality of rollers rotatably received in the stationary rail and putting thereon the lower flat wall portions of the movable rail are also provided. A plurality of ball bearings rotatably received in two parallel elongate spaces of generally rectangular cross section are included, each being defined by one of the upper wall portions and one of the hanging down portions of the stationary rail and one of the lower flat wall portions and one of the raised portions of the movable rail.

BRIEF DESCRIPTION OF THE DRAWINGS

FIG. 2 is a sectional view taken along the line II—II of FIG. 1;

FIG. 3 is a sectional view taken along the line III—III of FIG. 2; and

FIG. 4 is a sectional view of a conventional seat slide device.

DESCRIPTION OF ONE CONVENTIONAL SEAT SLIDE DEVICE

Figure 1:
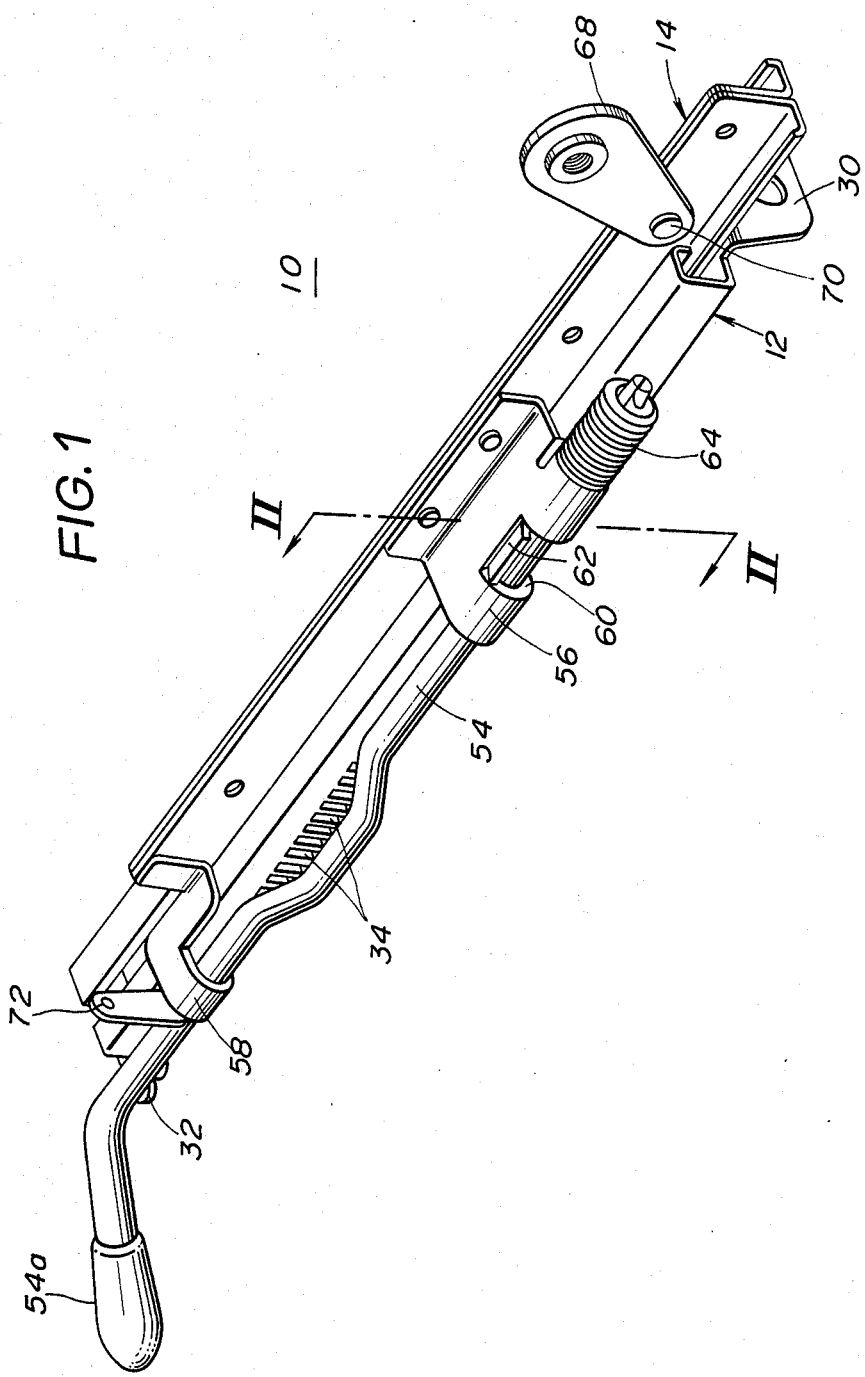
FIG. 1 a perspective view of a seat slide device of the present invention.

Prior to describing the seat slide device of the present invention, one conventional device will be described with reference to FIG. 4 in order to clarify the task of the present invention. The conventional device is disclosed in Japanese Patent First Provisional Publication No. 54-17224.

Referring to FIG. 4, there is shown, in a sectional manner, one of paired seat slide devices, which is generally designated by numeral 100. The device 100 is arranged to support one side of a vehicle seat on a vehicle floor 102, and the other device (not shown) having an identical construction to the device 100 is arranged to support the other side of the seat on the vehicle floor 102.

The conventional seat slide device 100 comprises an elongate stationary rail 104 which extends in a fore-and-aft direction on the vehicle floor 102 and is secured to the same, and an elongate movable rail 106 which is secured to a seat (not shown) and movable relative to the stationary rail 104. The stationary rail 104 comprises an elongate base portion 108 secured to the vehicle floor 102 and side wall portions 110 and 112 extending upwardly from opposed sides of the base portion 108. An upper end of each side wall portion 110 or 112 is curled inwardly and downwardly to provide a generally U-shaped guiding portion 114 or 116.

Slidably engaged with the stationary rail 104 is the movable rail 106 which comprises two elongate elements 118 and 120 of generally J-shaped cross section which are secured to each other in a back-to-back manner having their generally U-shaped guided portions 122 and 124 slidably intermeshed with the generally U-shaped guiding portions 114 and 116 of the stationary rail 104. A plurality of rollers 126 are received in the stationary rail 104 and put thereon the convex outer surfaces of the U-shaped guided portions 122 and 124 of the movable rail 106. Each roller 126 has thereabout two annular grooves (no numerals) for receiving therein the convex outer surfaces of the guided portions 122 and 124. A plastic sliding shoe 128 or 130 is mounted to the leading end of each guided portion 122 or 124 of the movable rail 106 and slidably received in each guiding portion 114 or 116 of the stationary rail 104. Designated by numeral 132 is an anchor connector secured to the movable rail 106, to which a seat belt anchor (not shown) is connected. Thus, upon the seat and the movable rail 106 secured thereto being pushed, they will slide forward or rearward on the stationary rail making the rollers 126 roll on and along the base portion 108 of the stationary rail 104.

When, due to for example a vehicle collision, an abonormally force is suddenly applied to the seat slide device 100 in a direction to raise the movable rail 106 from the stationary rail 104. In other words, if a force is applied to the seat slide device 100, in a direction to disengage the movable rail 106 from the stationary rail 104, the intermeshing connection between the U-shaped guiding and guided portions 114, 116, 122 and 124 of the stationary and movable rails 104 and 106 becomes tightened thereby preventing the disengagement of the movable rail 106 and thus the seat secured thereto from the stationary rail 104.

However, due to its inherent construction, the above-mentioned conventional seat slide device 100 has the following drawbacks.

That is, forming the stationary and movable rails 104 and 106 with the deeply drawn U-shaped guiding and guided portions 114, 116, 122 and 124 with accuracy has required an expensive high production technique or at least troublesome press work. In practice, it has been almost impossible to achieve a neat or exact coupling of the convex outer surface of each U-shaped guided portion with corresponding annular groove of each roller 126. That is, in the conventional device 100, the forward and rearward movement of the movable rail 106 is sometimes carried out having one of the U-shaped guided portions 122 and 124 thereof substantially disengaged from the corresponding annular groove of each roller 126. This induces an undesirable play of the movable rail 106 in the lateral and vertical directions as indicated by the arrows L and H, during its forward or rearward movement relative to the stationary rail 104. Of course, this play causes a passenger seated on the associated seat to feel uncomfortable during the seat position adjustment. This undesirable phenomenon becomes much more severe if the plastic sliding shoes 128 and 130 are not accurately constructed. In fact, it has sometimes occured that the movable rail 106 is prevented from making a smooth movement relative to the stationary rail 104 because of an unavoidable dimensional error of the shoes 128 and 130.

DETAILED DESCRIPTION OF THE INVENTION

Referring to FIGS. 1 to 3, there is shown a seat slide device 10 according to the present invention which is free of the drawbacks encountered in the above-mentioned conventional device 100. Similar to the case of the conventional device 100, the device 10 shown is arranged to support one side of a vehicle seat on a vehicle floor, and another device having identical construction to the device 10 is arranged to support the other side of the vehicle seat.

The seat slide device 10 of the invention comprises an elongate stationary rail 12 which extends in a fore-and-aft direction on the vehicle floor and is secured to the same, and an elongate movable rail 14 which is secured to a seat (not shown) and movable relative to the stationary rail 12. As is understood from FIG. 2, the stationary rail 12 comprises an elongate flat base portion 16, side wall portions 18 and 20 extending upwardly from opposed sides of the base portion 16, upper flat wall portions 22 and 24 extending inwardly in parallel with the base portion 16 from the upper ends of the side wall portions 18 and 20, and hanging down portions 26 and 28 extending downwardly, but slightly, from the inward ends of the upper flat wall portions 22 and 24. As is seen from FIG. 1, the stationary rail 12 is provided at its front and rear ends with inclined mounting stand portions 30 and 32 which are secured through bolts and nuts to the vehicle floor. It is to be noted that the left upper portion of FIG. 1 corresponds to a front portion of the vehicle floor on which the seat slide device 10 is mounted.

The side wall portion 20 of the stationary rail 12 is formed with a plurality of identical notches 33 (or rectangular openings) which are arranged along the axis of the stationary rail 12 at evenly spaced intervals.

Slidably engaged with the stationary rail 12 is the movable rail 14 which comprises two elongate elements 34 and 36 of generally L-shaped cross section which are secured to each other in back-to-back manner. Each element 34 or 36 thus comprises an elongate base portion (no numeral), a lower wall portion 38 or 40 extending outwardly from the lower end of the base portion, and a raised portion 42 or 44 extending upwardly, but slightly, from the outward end of the lower wall portion 38 or 40. As is seen from FIG. 2, upon assembly, the lower wall portions 38 and 40 of the movable rail 14 are received in the stationary rail 12 permitting the secured base portions to extend upwardly through an elongate clearance defined between the hanging down portions 26 and 28 of the stationary rail 12. Like in the case of the afore-mentioned conventional seat slide device 100, a plurality of rollers 46 are received in the stationary rail 12 and put thereon the lower surfaces of the lower wall portions 38 and 40 of the movable rail 14. It is to be noted that in the invention, the lower surfaces of the lower wall portions 38 and 40 of the movable rail 14 and the inner wall surface of the base portion 16 of the stationary rail 12 are constructed flat. A plurality of ball bearings 48 and 50 are rotatably received in two parallel elongate spaces (no numerals) of generally rectangular cross section each being defined by the upper wall portion 22 (or 24) and the hanging down portion 26 (or 28) of the stationary rail 12 and the lower wall portion 38 (or 40) and the raised portion 42 (or 44) of the movable rail 14. Although not shown in the drawings, known stopper members are fixed to the axial ends of the stationary rail 12 in order to prevent the rollers 46 and the ball bearings 48 and 50 from disengagement from their running trucks.

As is seen from FIG. 2, the base portion of the element 34 of the movable rail 14 is formed with a plurality of raised up portions 52 which are arranged along the axis of the movable rail 14 at suitable intervals. The portions 52 are arranged and sized so that when, due to for example a vehicle collision, the movable rail 14 is displaced upward relative to the stationary rail 12 bending the upper wall portion 22 of the stationary rail 12 outwardly, that is, in a clockwise direction in FIG. 2, the upper wall portion 22 of the stationary rail 12 is brought into engagement with the raised up portions 52 thereby suppressing disengagement of the movable rail 14 from the stationary rail 12.

As is clearly seen from FIG. 1, a control shaft 54 is connected through two spaced brackets 56 and 58 to the movable rail 14 in a manner to be rotatable about the axis thereof. For this, each bracket 56 or 58 is formed with a curled portion (no numeral) by which the control shaft 54 is rotatably supported. The bracket 56 is formed with a window 60 through which a part of the control shaft 54 is exposed. A latching plate 62 with three identical pawls 62a (see FIG. 3) is secured to the portion of the control shaft 54 to rotate therewith. The pawls 62a are engageable with suitable three of the notches 33 of the stationary rail 12 to latch the movable rail 14 to the stationary rail 12. A coil spring 64 is mounted to the bracket 56 to bias the control shaft 54 in a counterclockwise direction in FIG. 1, that is, in the direction to engage the pawls 62a of the plate 62 with the notches 33. The control shaft 54 has a forward end portion which is bent to provide a handle 54a. Thus, when the handle 54a is manipulated to rotate the control shaft 54 in a clockwise direction in FIG. 1 against the force of the spring 64, the pawls 62a of the latching plate 62 are disengaged from the notches 33 of the stationary rail 12 thereby to cancel the latched connection of the movable rail 14 relative to the stationary rail 12.

As is clearly understood from FIGS. 2 and 3, a rectangular reinforcing plate 66 is secured to the lower surface of the lower wall portion 40 of the movable rail 14 in the vicinity of the latching plate 62. The reinforcing plate 66 is formed with three identical notches 66a with which the leading ends of the pawls 62a of the latching plate 62 are engaged when the plate 62 assumes the latching position. As is seen from FIG. 2, the width W of each notch 66a of the reinforcing plate 66 is the same as that of the notch 33 of the stationary rail 12. With the provision of the reinforcing plate 66, deformation and/or breakage of the pawls 62a of the latching plate 62 is prevented even when an excessively high load is applied to the movable rail 14 in a direction parallel to the axis of the same. That is, when, under the rail latched condition wherein the pawls 62a of the latching plate 62 are engaged with both the notches 33 of the stationary rail 12 and the notches 66a of the reinforcing plate 66, an excessively high load is suddenly applied to the movable rail 14 in such direction, each pawl 62a of the latching plate 62 (see FIG. 3) is brought into contact with one side walls of the corresponding notches 33 and 66a. This means that upon application of abnormal shock to the movable rail 14, both ends of each pawl 62a of the latching plate 62 become supported by two fixed members (viz., the base portion of the latching plate 62 and the side wall of the notch 66a of the reinforcing plate 66) against a force applied to the pawl 62a by the side wall of the notch 33 of the stationary rail 12. This supporting measure prevents or at least minimizes the deformation or breakage of the pawls 62a of the latching plate 62.

As is seen from FIG. 1, the rear end portion of the movable rail 14 has an anchor connector 68 pivotally connected thereto through a pivot pin 70. A seat belt anchor (not shown) is connected to the connector 68. Designated by numeral 72 is a lever connected to the control shaft 54. Although not shown in the drawings, a link bar extends from the lever 72 to another lever connected to a control shaft of another seat slide device in order to achieve a simultaneous movement of these two control shafts. Of course, there is no need to provide the control shaft of the other device with a handle.

In the following, advantages of the present invention will be itemized:

(1) Since the running trucks or contacting portions of the movable and stationary rails 14 and 12 for the rollers 46 and the ball bearings 48 and 50 are substantially flat, manufacturing of these rails 12 and 14 is easily achieved with low cost.

(2) Because the elongate spaces for the ball bearings 48 and 50 have each a substantially rectangular cross section, undesirable lateral play of the movable rail 14 relative to the stationary rail 12 is assuredly suppressed or at least minimized.

(3) Since the contacting surfaces of the stationary and movable rails 12 and 14 relative to the rollers 46 are substantially flat, the bearing stress generated therebetween is small thereby lengthening the lives of these parts.

(4) Because of the provision of the projections 52 and the reinforcing plate 66, the undesirable desengagement of the movable rail 14 from the stationary rail 12, which would occur upon a vehicle collision, is assuredly prevented.

What is claimed is:

1. A seat slide device for sliding a seat relative to a floor, comprising:

a stationary rail including an elongate flat base portion adapted to be mounted on the floor, side wall portions extending upwardly from opposed sides of the base portion, upper flat wall portions extending toward each other from the upper ends of the side wall portions, and hanging down portions extending downwardly from the inward ends of the upper flat wall portions leaving therebetween an axially extending clearance;

a movable rail including an elongate base portion, lower flat wall portions each extending outwardly from the lower end of said elongate base portion and raised up portions extending upwardly from the outward ends of the lower flat wall portions, said movable rail being coupled with said stationary rail in such a manner that the lower flat wall portions are received in said stationary rail having the elongate base portion extending upwardly through said axially extending clearance of the stationary rail, said movable rail including two elements of generally L-shaped cross section which are secured to each other in back-to-back manner, one of said two elements being formed with a plurality of raised up portions which are arranged along a longitudinal axis of the movable rail leaving a given space between each raised up portion and one of said upper flat wall portions of the stationary rail;

a plurality of rollers rotatably received in said stationary rail and putting thereon said lower flat wall portions of the movable rail; and a plurality of ball bearings rotatably received in two parallel elongate spaces of generally rectangular cross section each being defined by one of the upper wall portions and one of the hanging down portions of the stationary rail and one of the lower flat wall portions and one of the raised up portions of the movable rail, said seat slide device further comprising a latch mechanism which comprises:

means defining a plurality of notches in the stationary rail, said notches being arranged along the axis of the stationary rail at evenly spaced intervals;

a control shaft supported by said movable rail in a manner to be rotatable about the axis thereof;

a latching plate secured to said control rod to rotate therewith, said latching plate having pawls which are engageable with some of said notches to latch said movable rail to said stationary rail;

biasing means for biasing said control shaft in a direction to engage the pawls of the latching plate with the notches of the stationary rail; and a reinforcing plate which is secured to said movable rail in the vicinity of said latching plate, said reinforcing plate being formed with notches with which leading ends of the pawls of the latching plate are engaged when said pawls are engaged with the notches of the stationary rail.

2. A seat slide device as claimed in claim 1, in which the width of each notch of the reinforcing plate is the same as that of the notch of the stationary rail.

3. A seat slide device for sliding a seat relative to a floor, comprising:

a stationary rail adapted to be mounted on the floor, said stationary rail having a generally C-shaped cross section and having opposed side wall portions;

a movable rail axially movably engaged with said stationary rail, said movable rail having a reversed T-shaped cross section and engaged with said stationary rail in such a manner that the laterally extending head portion of the movable rail is received in an elongate channel defined in said stationary rail;

movement smoothing means for smoothing the axial movement of the movable rail relative to said stationary rail; and a latch mechanism which comprises:

means defining a plurality of notches in one of the side wall portions of the stationary rail, said notches being arranged along the axis of the stationary rail at evenly spaced intervals;

a control shaft supported by said movable rail in a manner to be rotatable about the axis thereof;

a latching plate secured to said control shaft to rotate therewith, said latching plate having pawls which are engageable with said notches to latch said movable rail to said stationary rail;

biasing means for biasing said control shaft in a direction to engage the pawls of the latching plate with the notches of the stationary rail; and a reinforcing plate secured to said laterally extending head portion of said movable rail in the vicinity of said latching plate, said reinforcing plate being formed with notches with which leading ends of the pawls of the latching plate are engaged when said pawls are engaged with the notches of the stationary rail.

* * * * *